United States Patent
Torigoe

(10) Patent No.: US 9,246,815 B2
(45) Date of Patent: Jan. 26, 2016

(54) LOAD REDUCING SYSTEM AND LOAD REDUCING METHOD

(75) Inventor: Keisuke Torigoe, Tokyo (JP)

(73) Assignee: NEC Corporation, Tokyo (JP)

( * ) Notice: Subject to any disclaimer, the term of this patent is extended or adjusted under 35 U.S.C. 154(b) by 54 days.

(21) Appl. No.: 14/349,031

(22) PCT Filed: Sep. 15, 2012

(86) PCT No.: PCT/JP2012/073756
§ 371 (c)(1),
(2), (4) Date: Apr. 1, 2014

(87) PCT Pub. No.: WO2013/051386
PCT Pub. Date: Apr. 11, 2013

(65) Prior Publication Data
US 2014/0247725 A1    Sep. 4, 2014

(30) Foreign Application Priority Data
Oct. 5, 2011    (JP) .................. 2011-220784

(51) Int. Cl.
*H04L 12/26*    (2006.01)
*H04L 12/801*   (2013.01)
*H04L 12/28*    (2006.01)
*H04L 29/06*    (2006.01)
(Continued)

(52) U.S. Cl.
CPC ............ *H04L 47/10* (2013.01); *H04L 12/2869* (2013.01); *H04L 12/2874* (2013.01); *H04L 29/0653* (2013.01); *H04L 47/20* (2013.01); *H04L 47/2441* (2013.01)

(58) Field of Classification Search
None
See application file for complete search history.

(56) References Cited

U.S. PATENT DOCUMENTS

| 6,839,346 | B1* | 1/2005 | Kametani ............... H04L 45/00 370/389 |
| 7,440,457 | B2  | 10/2008 | Okuno |
| 8,254,390 | B2* | 8/2012 | Hall ...................... H04L 47/125 370/394 |

(Continued)

FOREIGN PATENT DOCUMENTS

| JP | 2005-117206 A | 4/2005 |
| JP | 2011-166700 A | 8/2011 |

(Continued)

OTHER PUBLICATIONS

English Translation of International Preliminary Report on Patentability in PCT No. PCT/JP2012/073756 dated Apr. 8, 2014.

(Continued)

*Primary Examiner* — Otis L Thompson, Jr.
(74) *Attorney, Agent, or Firm* — Finnegan, Henderson, Farabow, Garrett & Dunner LLP

(57) ABSTRACT

An open flow network system is stabilized while reducing a load, by reducing inquiries of a flow entry to a controller about a flow in which a flow registration has not completed. Specifically, the controller registers the flow entry that defines a rule and an action to uniformly control packets as a flow in a flow table of a switch. When receiving a packet, the switch carries out an inquiry of the flow entry corresponding to the received packet to the controller, if the flow entry corresponding to the received packet is not registered on the flow table, and stacks the received packet. Also, the switch controls the transfer of the received packet which has the same header data as the stacked packet by using the stacked packet until the flow entry corresponding to the received packet is registered.

10 Claims, 7 Drawing Sheets

(51) Int. Cl.
*H04L 12/813* (2013.01)
*H04L 12/851* (2013.01)

(56) References Cited

U.S. PATENT DOCUMENTS

| | | | | |
|---|---|---|---|---|
| 2003/0002438 A1* | 1/2003 | Yazaki | H04L 29/06 | 370/229 |
| 2005/0074005 A1 | 4/2005 | Okuno | | |
| 2005/0213504 A1* | 9/2005 | Enomoto | H04L 41/142 | 370/235 |
| 2006/0098675 A1* | 5/2006 | Okuno | H04L 49/90 | 370/412 |
| 2006/0133374 A1* | 6/2006 | Sekiguchi | H04L 49/602 | 370/389 |
| 2010/0271964 A1* | 10/2010 | Akhter | H04L 43/0817 | 370/252 |
| 2011/0261723 A1* | 10/2011 | Yamato | H04L 45/34 | 370/255 |
| 2011/0286461 A1* | 11/2011 | Ichino | H04L 47/6205 | 370/394 |
| 2012/0314605 A1 | 12/2012 | Akiyoshi | | |
| 2014/0098669 A1* | 4/2014 | Garg | H04L 47/12 | 370/235 |

FOREIGN PATENT DOCUMENTS

| | | |
|---|---|---|
| JP | 2011-166704 A | 8/2011 |
| WO | WO 97/28505 | 8/1997 |
| WO | WO 2011/108205 A1 | 9/2011 |

OTHER PUBLICATIONS

Japanese Office Action dated Jan. 23, 2015 with a partial English translation thereof.
"OpenFlow Switch Specification, Version 1.0.0", [online], Dec. 31, 2009,[searched on Sep. 8, 2011], Internet (URL: http://www.openflowswitch.org/ documents/opeflow-spec-v1.0.0.pdf).
International Search Report in PCT/JP2012/073756 dated Nov. 27, 2012 (English Translation Thereof).
Extended European Search Report dated Apr. 16, 2015.
"Openflow Switch Specification Version 1.1.0 Implemented", Internet Citation, Feb. 28, 2011, pp. 1-56, XP008166938, Retrieved from the Internet: URL:http://web.archive.org/web/2011 0516201950/http:/1 www.openflow.org/documents/openflow-spec-v1.1.0.pdf [retrieved on Jan. 24, 2014].
"HOTITutorial201 0—Open Flow Wiki", Dec. 12, 2010, XP055180923, Retrieved from the Internet: URL:https://web.archive.org/web/201 01212234721 /http:// www.openflowswitch.org/wklindex.php/HOTITutorial20i 0 [retrieved on Apr. 2, 2015].
Office Action issued by the Russian Patent Office on Sep. 9, 2015, in counterpart Russian Patent Application No. 2014117619.

* cited by examiner

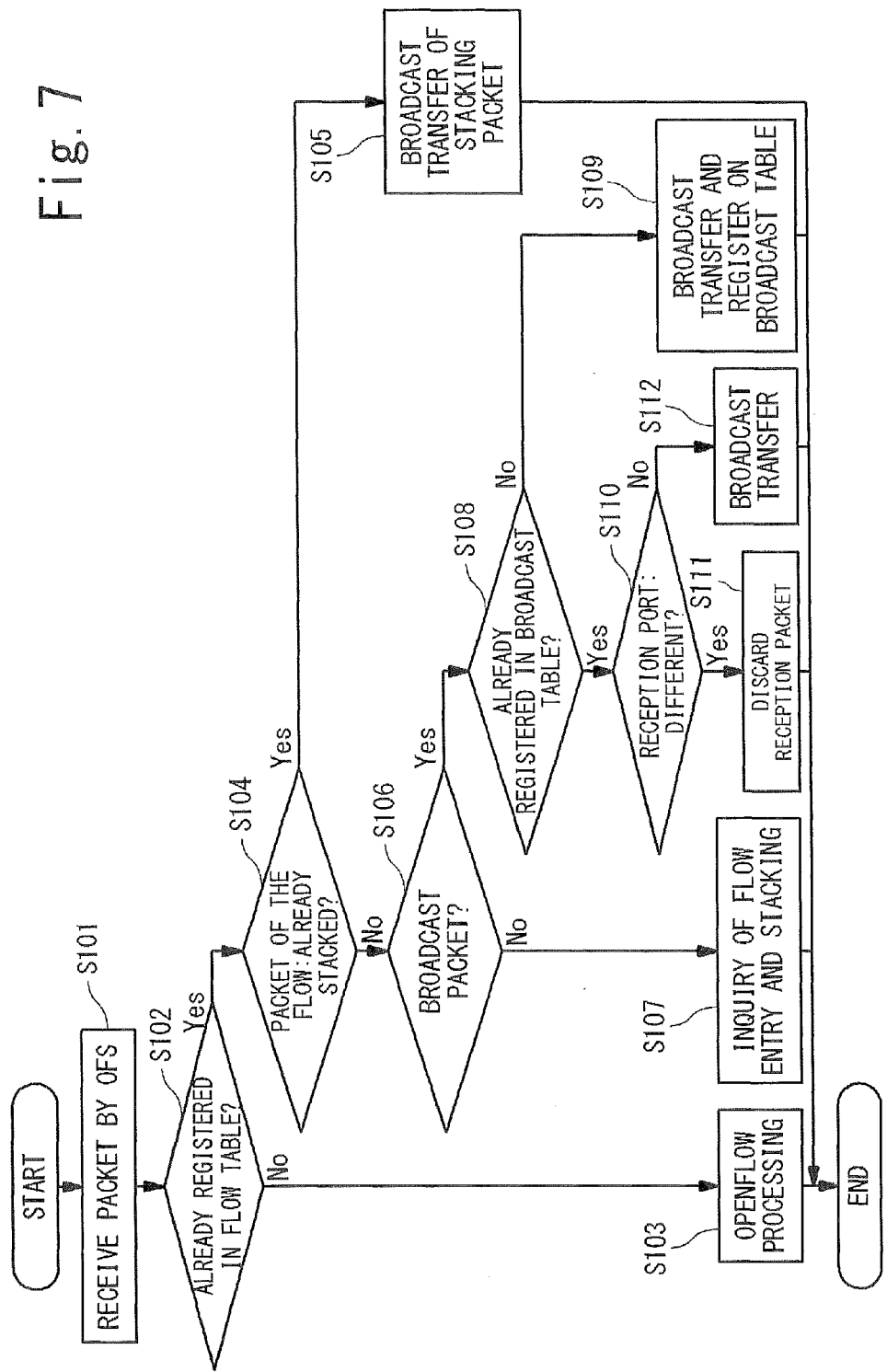

LOAD REDUCING SYSTEM AND LOAD REDUCING METHOD

TECHNICAL FIELD

The present invention relates to a load reducing system, and more particularly relates to a load reducing system of a controller in a CD separation type network.

BACKGROUND ART

A method of controlling a switch, a terminal and the like (data plane) from an external controller (control plane) is referred to as a CD (C: control plane/D: data plane) separation type architecture. A network configuration of the above CD separation type architecture is referred to as a CD separation type network.

As an example of the CD separation type network, an open flow network is exemplified which uses an open flow (Open-Flow) technique for carrying out a route control of a network by controlling switches from a controller. Note that the open flow network is merely one example.

(Open Flow Network)

In the open flow network, a series of communications, which are determined by combinations of a MAC address, an IP address, a port number and the like, is defined as a "flow". A route control, a trouble recovery, a load distribution, an optimization are carried out in a flow unit.

In the open flow network, a controller such as an OFC (OpenFlow Controller) controls the behavior of a switch by operating a flow table of the switch such as OFS (OpenFlow Switch).

The controller and the switch are connected by a secure channel to control the switch with use of a control message based on an open flow protocol by the controller. The controller and the switch transmit and receive open flow messages in conformity to the open flow (OpenFlow) protocol through the secure channel.

The switches in the open flow network configure the open flow network and are present as edge switches and core switches, which are controlled by the controller. Note that the edge switch is a switch located at a boundary between the open flow network and a network differing from it. Also, the core switch is a switch used to relay a packet in the open flow network. In the open flow network, the controller can operate the flow table of the switch on a route and control a flow from the reception (inflow) of the packet at an input side edge switch (Ingress) to the transmission (outflow) of the packet at an output side edge switch (Egress).

The packet may be referred to as a frame. A difference between the packet and the frame is merely a difference in a unit of a data handled in a protocol (PDU: Protocol Data Unit). The packet is the PDU of "TCP/IP" (Transmission Control Protocol/Internet Protocol). On the other hand, the frame is the PDU of "Ethernet" (Registered Mark).

The flow table is a table in which a flow entry is registered to define a predetermined action performed on the packet complying with a predetermined match condition (rule).

The rule of the flow entry is defined based on a combination of one or more of a destination address, a source address, a destination port and a source port, which are included in a header region of the packet in each protocol hierarchy, and they can be discriminated. Note that the above address shall include a MAC address (Media Access Control Address) and an IP address (Internet Protocol Address). Also, in addition to the above, data of an ingress port can be used as the rule of the flow entry.

The action of the flow entry indicates an operation of "Output to Particular Port", "Discard" or "Rewrite of Header". For example, when the action of the flow entry indicates an identification data of an output port (Output Port Number, Etc), the switch outputs the packet to the port corresponding to this, and when the identification data of the output port is not indicated, the packet is discarded. Or, when the action of the flow entry indicates the header data, a header of the packet is rewritten on the basis of the header data.

The switch in the open flow network executes the action of the flow entry to a packet group (packet series) that complies with the rule of the flow entry.

The detail of the open flow technique is described in Non-Patent Literature 1.

In the open flow network in which a flow setup is not completed in advance, for each of unknown packets (first packets) that firstly received by the switch, a copy (mirror packet) of a received packet is transferred as an inquiry message (packet in) of the flow entry from the switch to the controller, until the flow entry is registered in the flow table.

However, when packets of a same flow whose flow entry is not registered in the flow table are continuously received by the switch, the number of the inquiry messages (packet in) of the flow entry to the controller increases, to increase a burden of the controller.

When a load is imposed to the controller that manages the open flow network, a problem is caused in the stabilization of the network. Thus, the decrease of the load on the control is requested.

CITATION LIST

Non-patent Literature 1: "OpenFlow Switch Specification, Version 1.0.0",
[online], Dec. 31, 2009,
[searched on Sep. 8, 2011],
Internet (URL: http://www.openflowswitch.org/documents/opeflow-spec-v1.0.0.pdf)

SUMMARY OF THE INVENTION

As a first problem, in the open flow network, in case of continuously receiving by the switch, packets of a same flow whose flow entry is not registered on a flow table, when the processing performance of the controller is low, an inquiring message (packet in) of the flow entry is transmitted many times from the switch to the controller so that a load to the controller is increased.

As a second problem, the open flow network is configured so that the switch cannot transfer the packets when the flow entry is not registered on the flow table.

An object of the present invention is to provide a technique that a load to the controller is reduced to improve efficiency of the whole open flow network by transferring the packet to a predetermined destination without transmitting the inquiring message (packet in) of the flow entry to the controller, when receiving the packets (unregistered packets) whose flow entry is not registered on the flow table, in order to solve the above problems.

A load reducing system according to the present invention includes: a switch configured to carry out processing of a received packet based on a flow entry defining a rule and an action to uniformly control packets as a flow; and a controller configured to set the flow entry to the switch. When receiving a given packet, the switch carries out an inquiry of a flow entry corresponding to the received given packet to the controller, if the flow entry corresponding to the received given packet is not set, stacks the received given packet, and controls a transfer of one of the packets which has a same header data as the stacked packet until by using the stacked packet until the flow entry corresponding to the received packet is registered.

A switch according to the present invention includes: means for receiving a flow entry that defines a rule and an action to uniformly control packets as a flow from a controller; means for, when receiving a packet, carrying out an inquiry of the flow entry corresponding to the received packet to the controller if the flow entry corresponding to the received packet has not been registered; means for stacking the received packet; and means for controlling a transfer of the packet which has the same header data as the stacked packet by using the stacked packet until registration of the flow entry corresponding to the received packet.

A load reducing method according to the present invention includes: receiving registration, by a controller, of a flow entry that defines a rule and an action to uniformly control packets as a flow; carrying out, when receiving a packet, an inquiry of the flow entry corresponding to the received packet to the controller if the flow entry corresponding to the received packet has not been registered; stacking the received packet; and controlling a transfer of a packet which has the same header data as the stacked packet by using the stacked packet, until the flow entry corresponding to the received packet is registered.

A recording medium of the present invention stores a program for making a switch executing: receiving registration by a controller, of a flow entry that defines a rule and an action to uniformly control packets as a flow; carrying out, when receiving a packet, an inquiry of the flow entry corresponding to the received packet to the controller if the flow entry corresponding to the received packet has not been registered; stacking the received packet; and controlling a transfer of a packet which has the same header data as the stacked packet by using the stacked packet, until the flow entry corresponding to the received packet is registered.

The present invention can suppress the load to the controller (OFC) and can transfer an unregistered packet, the flow entry of which is not registered on the flow table.

BRIEF DESCRIPTION OF THE DRAWINGS

FIG. 7 is a flowchart showing an operation of the load reducing system according to the present invention.

DESCRIPTION OF THE EXEMPLARY EMBODIMENTS

The present invention targets a CD separation type network. Here, an open flow network as one of the CD separation type networks is described as an example. However, actually, the present invention is not limited to the open flow network.

<Basic Configuration>

A configuration example of the present invention will be described below with reference to the attached drawings.

Figure 1:
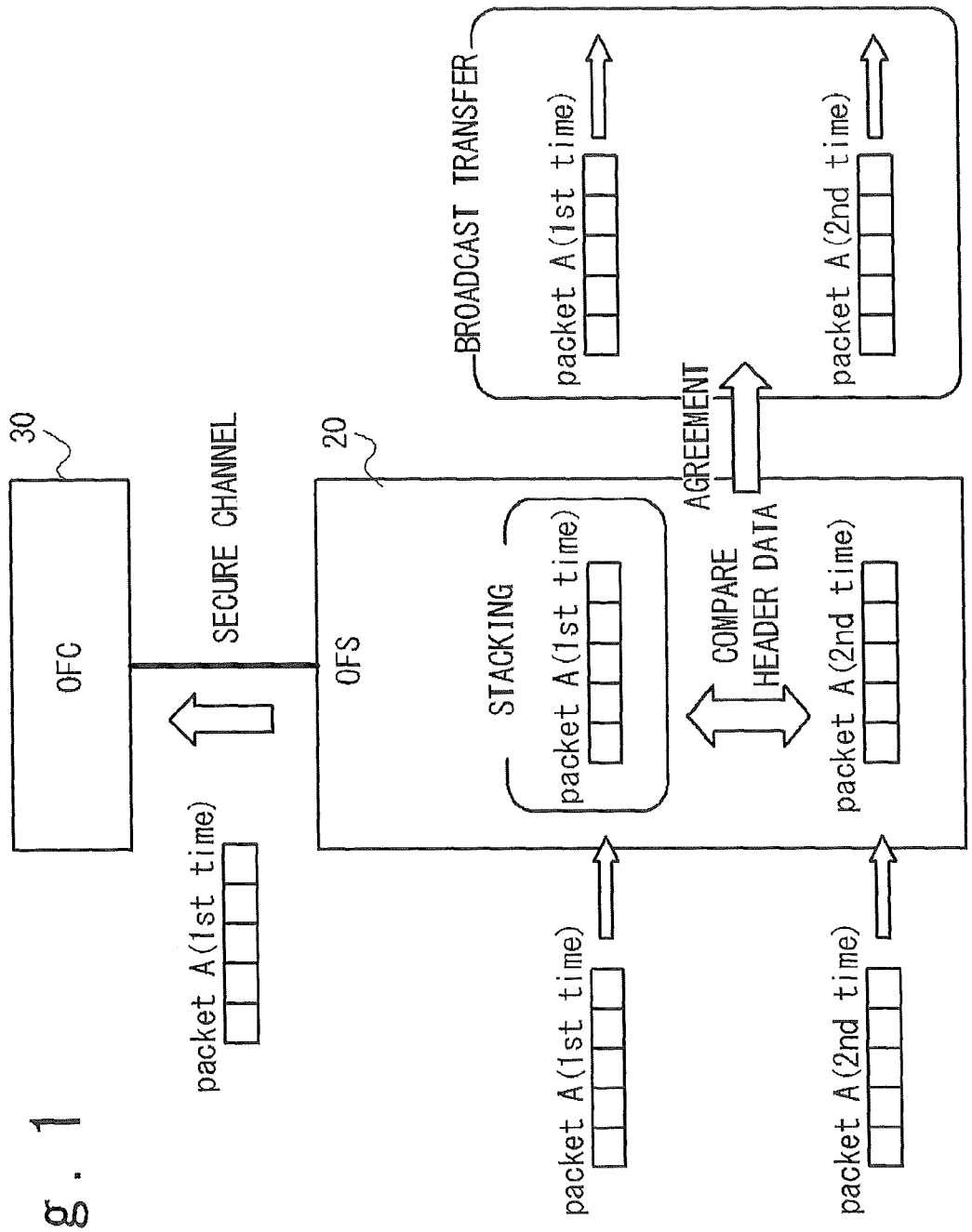
FIG. 1 is a block diagram showing a configuration example of a load reducing system according to the present invention.

As shown in FIG. 1, a load reducing system according to the present invention includes a switch 20 and a controller 30.

In the drawings, the switch is noted as an "OFS", and the controller is noted as an "OFC".

The switch 20 is a switching node in the open flow network. The switch 20 transfers a received packet in accordance with a flow entry registered in its own flow table.

The controller 30 is a server apparatus which carries out a route control of the switch 20 in the open flow network. The controller 30 is connected to the switch 20 through a secure channel. The controller 30 registers a flow entry in the flow table of the switch 20.

When receiving a packet, the switch 20 inquires a flow entry corresponding to the received packet to the controller 30, if the flow entry corresponding to the received packet is not registered in the flow table, and stacks (temporally stores, holds or accumulates) the received packet, and uses the stacked packet to control the transfer of the packet that has the same header data as the stacked packet, until the registration of the flow entry corresponding to the received packet. Here, since the switch 20 cannot specify a transmission destination of a next stage until the registration of the flow entry, the switch 20 transfers the packet to all of connected adjacent switches independently from address data of the packet. That is, the packet is transferred as a pseudo broadcast packet. However, the address data of the packet itself is not required to be changed.

First Exemplary Embodiment

A first exemplary embodiment of the present invention will be described below with reference to the attached drawings.
(System Configuration)

A configuration example of the load reducing system according to the present invention will be described below with reference to FIGS. 2 to 6.

The load reducing system according to the present invention includes terminals 10 (10-$i$, i=1 to n: n is arbitrary) and switches 20 (20-$j$, j=1 to m: m is arbitrary) and the controller 30.

Figure 2:
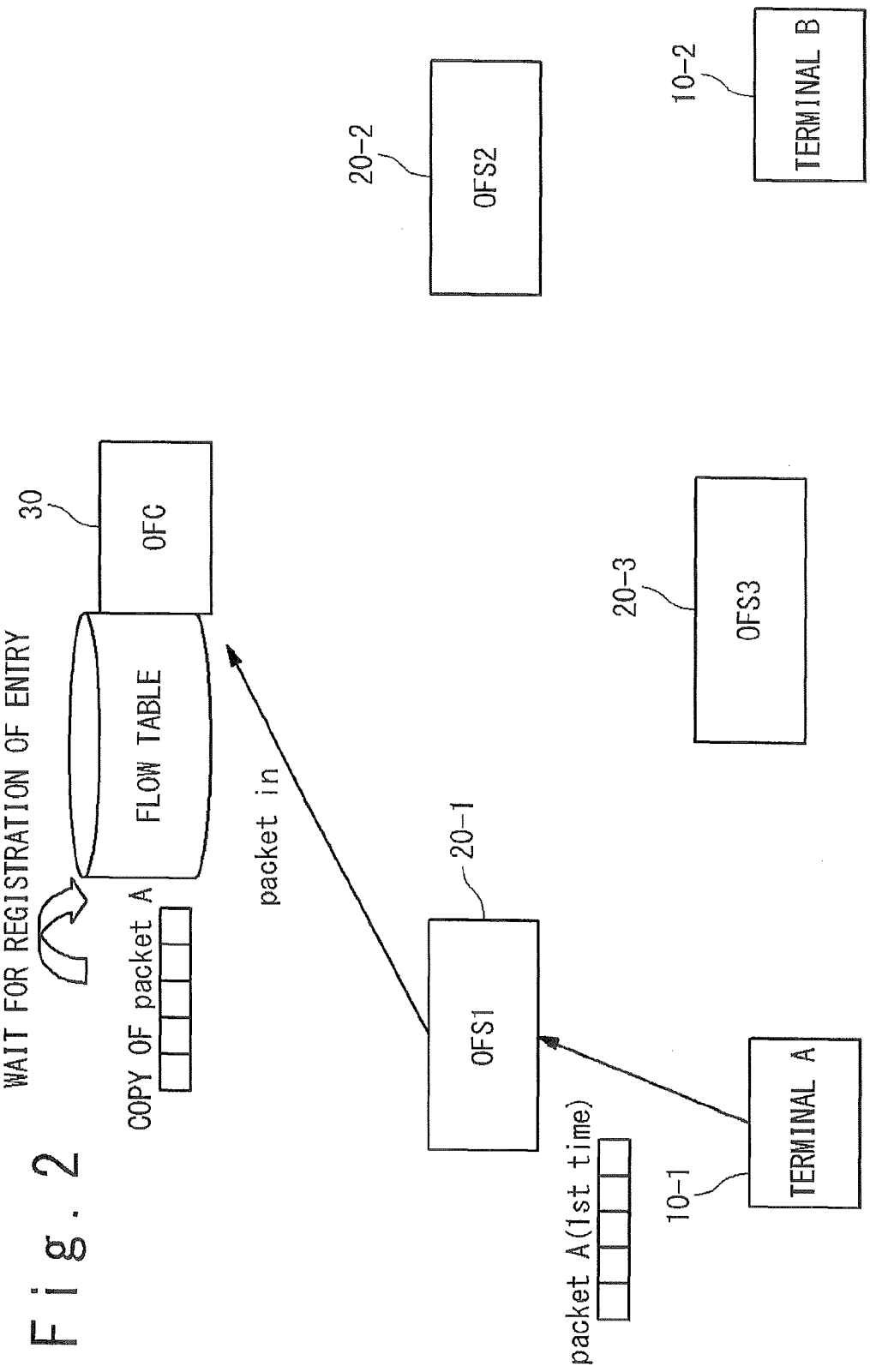
FIG. 2 is a first diagram showing the load reducing system according to the present invention.

In FIG. 2, the switch is noted as an "OFS", and the controller is noted as an "OFC".

Each of the terminals 10 (10-$i$, i=1 to n) is a terminal that can be connected to the switches 20 (20-$j$, j=1 to m). Note that each of the terminals 10 (10-$i$, i=1 to n) may be a switch (switching node) (that does not correspond to the open flow) outside the open flow network.

Each of the switches 20 (20-$j$, j=1 to m) is a switching node in the open flow network. Each of the switches 20 (20-$j$, j=1 to m) transfers the received packet in accordance with the flow entry registered in its own flow table. Note that when receiving a flow entry non-registered packet, each of the switches 20 (20-$j$, j=1 to m) transfers a copy of the received packet (mirror packet) to the controller 30 as an inquiry message (packet in).

The controller 30 is a server unit which carries out the route control for each of the switches (20-$j$, j=1 to m), in the open flow network. The controller 30 is connected through the secure channel to each of the switches 20 (20-$j$, j=1 to m). When detecting each of the switches 20 (20-$j$, j=1 to m), the controller 30 calculates a packet transfer route on the basis of topology data that indicates a connection state of the network, and registers a flow entry in the flow table of each of the switches (OFS) located on the route. Note that the controller 30 may hold a flow table that serves as a master table held by each of the switches 20 (20-*j*, j=1 to m). For example, when receiving the inquiry message (packet in) of the flow entry, the controller 30 firstly registers an entry in the master table (flow table) held by the controller 30 itself, and transmits a control message to the switch (OFS) as an inquiry source so as to register the same entry in the flow table (or the table corresponding to the flow table) held by the switch (OFS).

Here, the terminal 10-1 is a transmission source terminal (terminal A) that transmits a packet. The terminal 10-2 is a destination terminal (terminal B) that receives the packet. The switch 20-1 is an input side edge switch (OFS1). The switch 20-2 is an output side edge switch (OFS2). The switch 20-3 is a core switch (OFS3). The controller 30 is a controller (OFC) for carrying out the route control between the switches (OFS). The controller 30 is assumed to hold a flow table of each of the switch 20-1, the switch 20-2 and the switch 20-3.

However, actually, it is not limited to those examples.

(Exemplification of Hardware)

As an example of the terminal 10 (10-*i*, i=1 to n), a PC (personal computer), a mobile note PC, a thin client terminal, a workstation, a mobile telephone, a smart phone, a smart book, a car navigation system, a mobile game machine, a home game machine, a portable music player, a handy terminal, a gadget (electronic device), an interactive television, a digital tuner, a digital recorder, an information home appliance, an OA (office automation) device and the like are exemplified. The terminal 10 (10-*i*, i=1 to n) may be installed in a mobile body such as a vehicle, a ship, and an airplane.

As an example of the switch 20 (20-*j*, j=1 to m), a network switch, a router, a proxy, a gateway, a firewall, a load balancer (load distribution device), a band control device (packet shaper), a security monitor control device (SCADA: Supervisory Control And Data Acquisition), a gate keeper, a base station, an access point, a communication satellite (CS) or a calculation machine having a plurality of communication ports and the like are exemplified. Also, the switch 20 (20-*j*, j=1 to m) may be a virtual switch built-up on a physical machine.

As an example of the controller 30, a PC, an appliance, a workstation, a mainframe, and a calculation machine such as a supercomputer are assumed. Note that the controller 30 may be an extension board installed in the calculation machine or a virtual machine (VM) built-up on a physical machine.

Although not shown, each of the terminals 10 (10-*i*, i=1 to n), the switches 20 (20-*j*, j=1 to m) and the controller 30 is configured from: a processor that is driven in accordance with a program and executes a predetermined process; a memory for storing the program and various data; and an interface that is used to communicate with the network.

As an example of the above processor, a CPU (Central Processing Unit), a network processor (NP), a microprocessor, a microcontroller, or a semiconductor integrated circuit (IC) having a dedicated function and the like are exemplified.

As an example of the above memory, RAM (Random Access Memory), ROM (Read Only Memory), EEPROM (Electrically Erasable and Programmable Read Only Memory), a semiconductor storage device such as a flash memory, an assistant storage device such as HDD (Hard Disk Drive) and SSD (Solid State Drive), or a removable disk such as DVD (Digital Versatile Disk), or a storage media such as an SD memory card (Secure Digital memory card) are exemplified. Also, a register may be used. Or, a storage device, which uses DAS (Direct Attached Storage), FC-SAN (Fibre Channel—Storage Area Network), NAS (Network Attached Storage), IP-SAN (IP—Storage Area Network) may be used.

Note that the above processor and the above memory may be integrated into one unit. For example, in recent years, a 1-chip structure of micro-computers is progressed. Thus, an example may be considered in which one chip microcomputer installed in an electronic device contains the processor and the memory.

As an example of the above interface, a substrate (a mother board or an I/O board) that conforms to a network communication, a semiconductor integrated circuit such as a chip, a network adaptor such as NIC (Network Interface Card), a similar extension card, a communication device such as an antenna, and a communication port such as a communication port (connector) are exemplified.

Also, as an example of the network, the Internet, a LAN (Local Area Network), a wireless LAN, a WAN (Wide Area Network), a backbone, a cable television (CATV) line, a fixed telephone network, a mobile telephone network, a WiMAX (IEEE 802.16a), 3G (3rd Generation), a lease line, an IrDA (Infrared Data Association), the Bluetooth (Registered Mark), a serial communication line, a data bus and the like are exemplified.

Note that the components of each of the switches 20 (20-*j*, j=1 to m) and the controller 30 may be a module, a component, or a dedicated device, or a program for starting (calling) them.

However, actually, they are not limited to those examples.

Example

An example of the load reducing system according to the present invention will be described below.

At first, in FIG. 2, the switch 20-1 (OFS1) receives a first packet (packet A) from the terminal 10-1 (terminal A). The switch 20-1 (OFS1) retrieves the flow table. Then, if the corresponding flow entry does not exist (in a case of "miss hit"), in order to register the first packet (packet A) in the flow table, the switch 20-1 (OFS1) transmits an inquiry message (packet in) of the flow entry to the controller 30 (OFC) by transferring a copy (mirror packet) of the first packet (packet A), and stacks (temporally stores, holds and accumulates) the first packet (packet A) in the switch 20-1 (OFS1). When receiving the inquiry message (packet in) of the flow entry from the switch 20-1 (OFS1), the controller 30 (OFC) registers the entry of the first packet (packet A) in the flow table for the switch 20-1 (OFS1).

Figure 3:
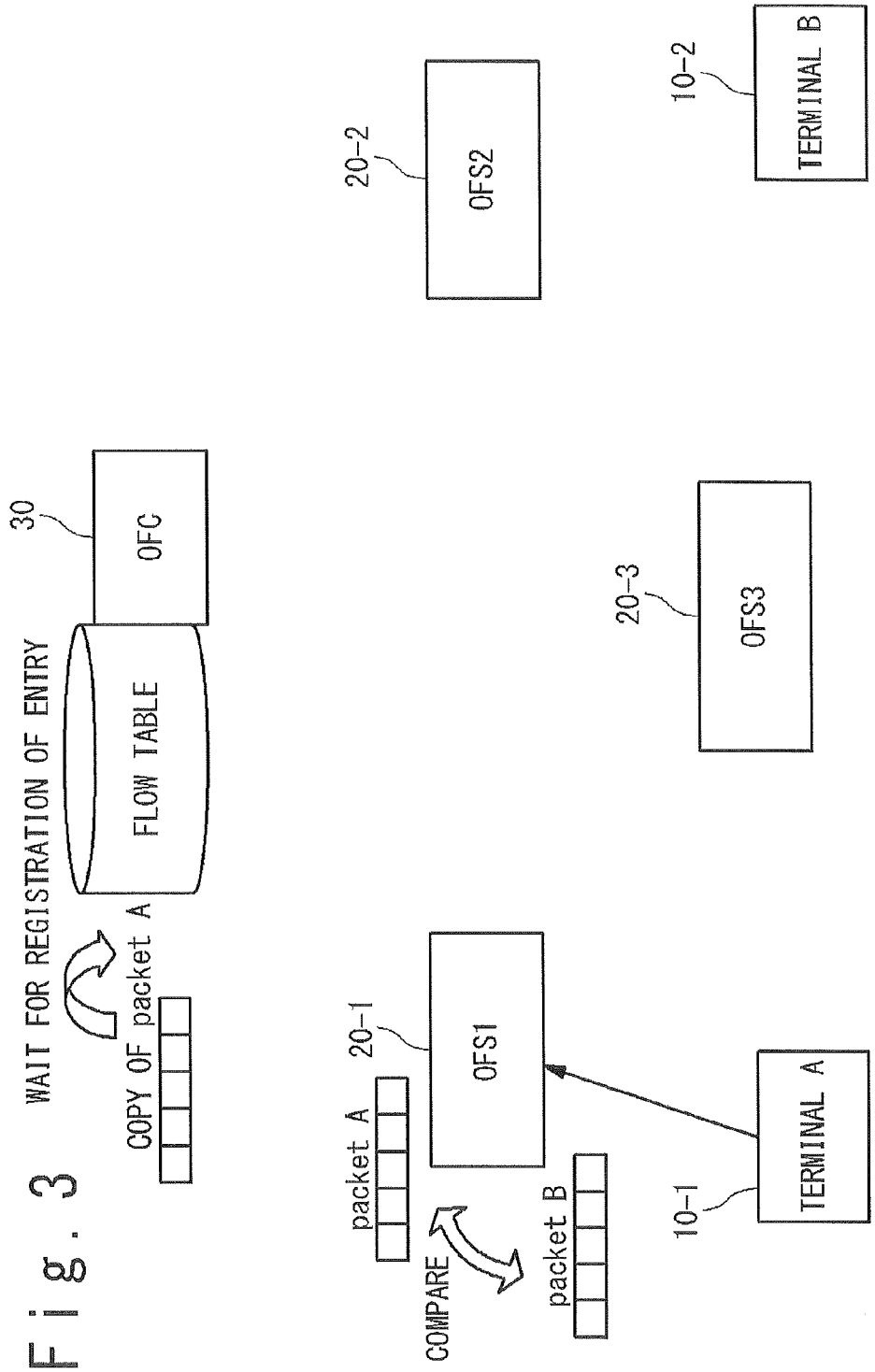
FIG. 3 is a second diagram showing the load reducing system according to the present invention.

Next, in FIG. 3, when receiving a second packet (packet B) while taking a time to register an entry of the first packet (packet A) (at a time of a waiting state for the entry registration), the switch 20-1 (OFS1) compares the second packet (packet B) and the stacked first packet (packet A). For example, the respective header data of the second packet (packet B) and the first packet (packet A) are compared partially or entirely to check whether or not both of the packets belong to the same flow.

Figure 4:
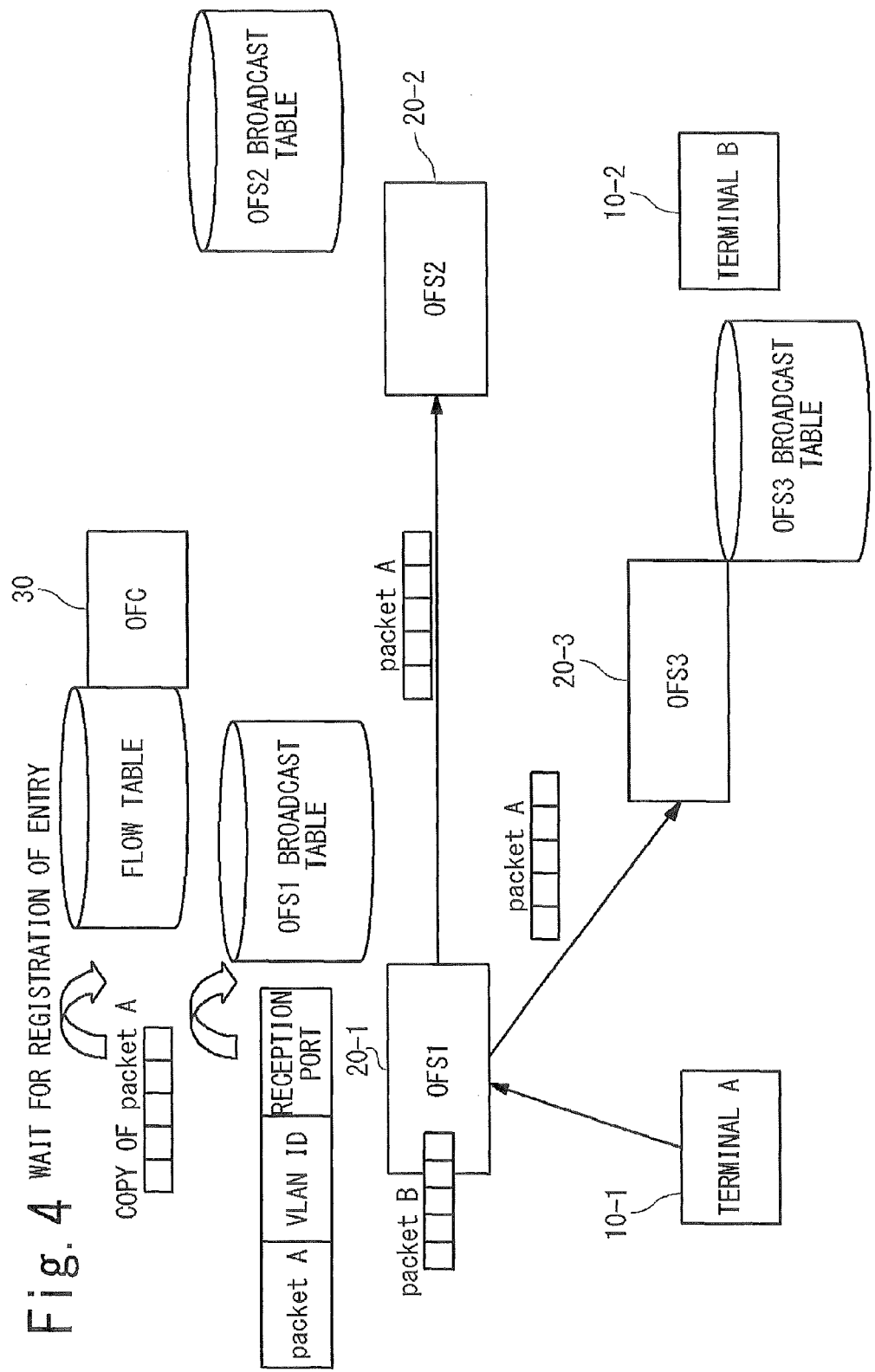
FIG. 4 is a third diagram showing the load reducing system according to the present invention.

In FIG. 4, if the first packet (packet A) and the second packet (packet B) are packets belonging to the same flow, the switch 20-1 (OFS1) broadcasts the first packet (packet A) to all of the ports, each of which has a same virtual LAN identifier (VLAN ID) as the reception port of the second packet (packet B), and transfers the first packet (packet A) to the switch 20-2 (OFS2) and the switch 20-3 (OFS3). Also, the switch 20-1 (OFS1) again stacks the second packet (packet B) until receiving the packet belonging to the same flow. Moreover, the switch 20-1 (OFS1) generates a broadcast table for the switch 20-1 (OFS1). At this time, the switch 20-1 (OFS1) stores in the broadcast table, the flow data of the first packet (packet A), the virtual LAN identifier (VLAN ID), and the port data (the data of "reception port"), when the first packet (packet A) is received by the switch 20-1 (OFS1). The broadcast table is a table that stores the data to broadcast packets. The broadcast table may be one kind of the flow table. The flow data is data that defines a rule and an action for the packet. Note that since the action is defined to be the broadcast, an item to be defined may be only the rule.

Figure 5:
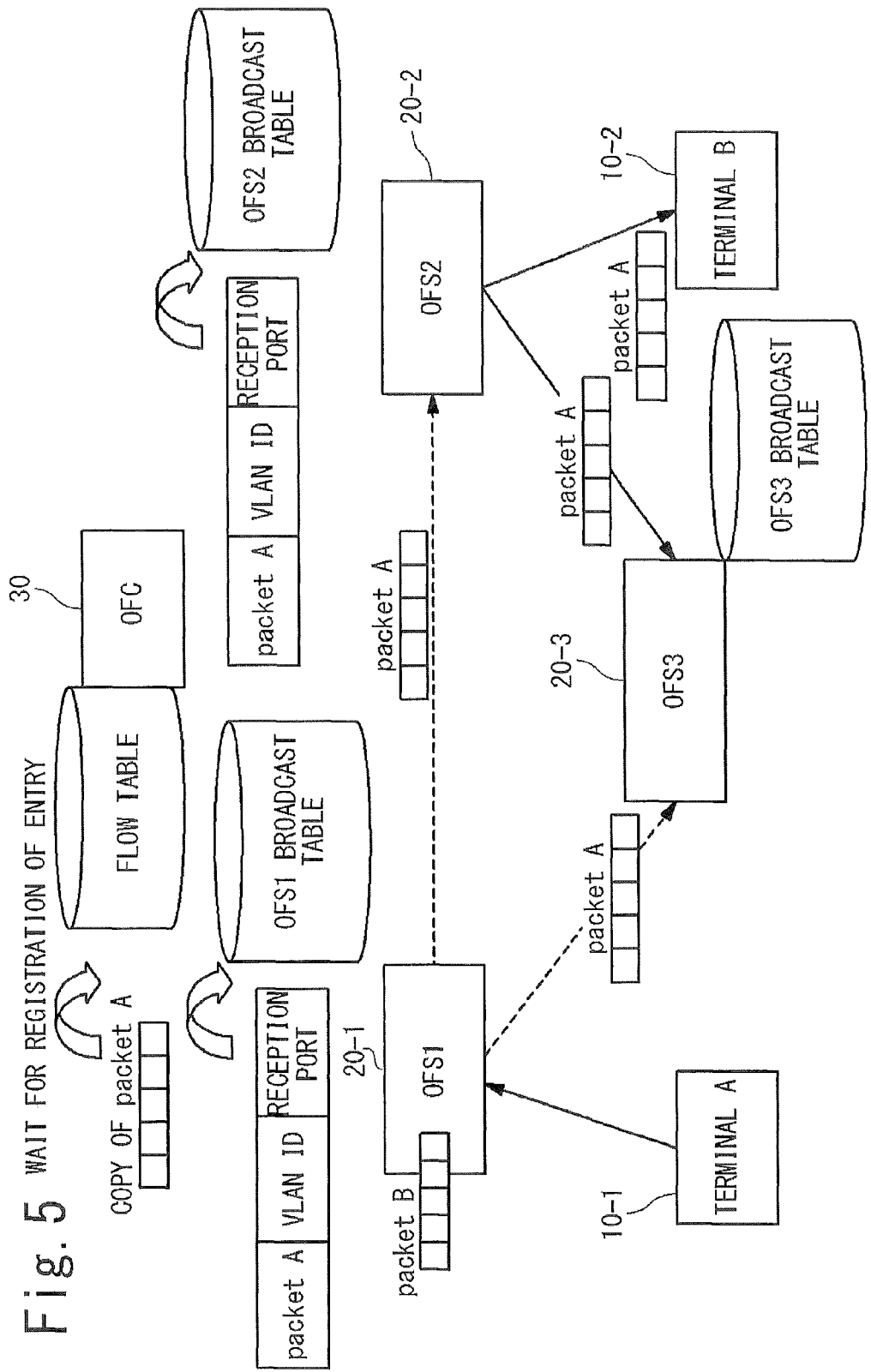
FIG. 5 is a fourth diagram showing the load reducing system according to the present invention.

Moreover, in FIG. 5, the switch 20-2 (OFS2) receives the first packet (packet A) broadcasted from the switch 20-1 (OFS1). If a flow entry for the broadcasted first packet (packet A) is not registered in the flow table, the switch 20-2 (OFS2) broadcasts the broadcasted first packet (packet A) to all of the ports, which have the same virtual LAN identifier (VLAN ID) as the reception port of the first packet (packet A), to transfer the first packet (packet A) to the switch 20-3 (OFS3) and the terminal 10-2 (terminal B). Moreover, the switch 20-2 (OFS2) generates the broadcast table for the switch 20-2 (OFS2). At this time, the switch 20-2 (OFS2) stores the flow data of the first packet (packet A), the virtual LAN identifier (VLAN ID), and the input port data of the flow data, in the broadcast table.

Figure 6:
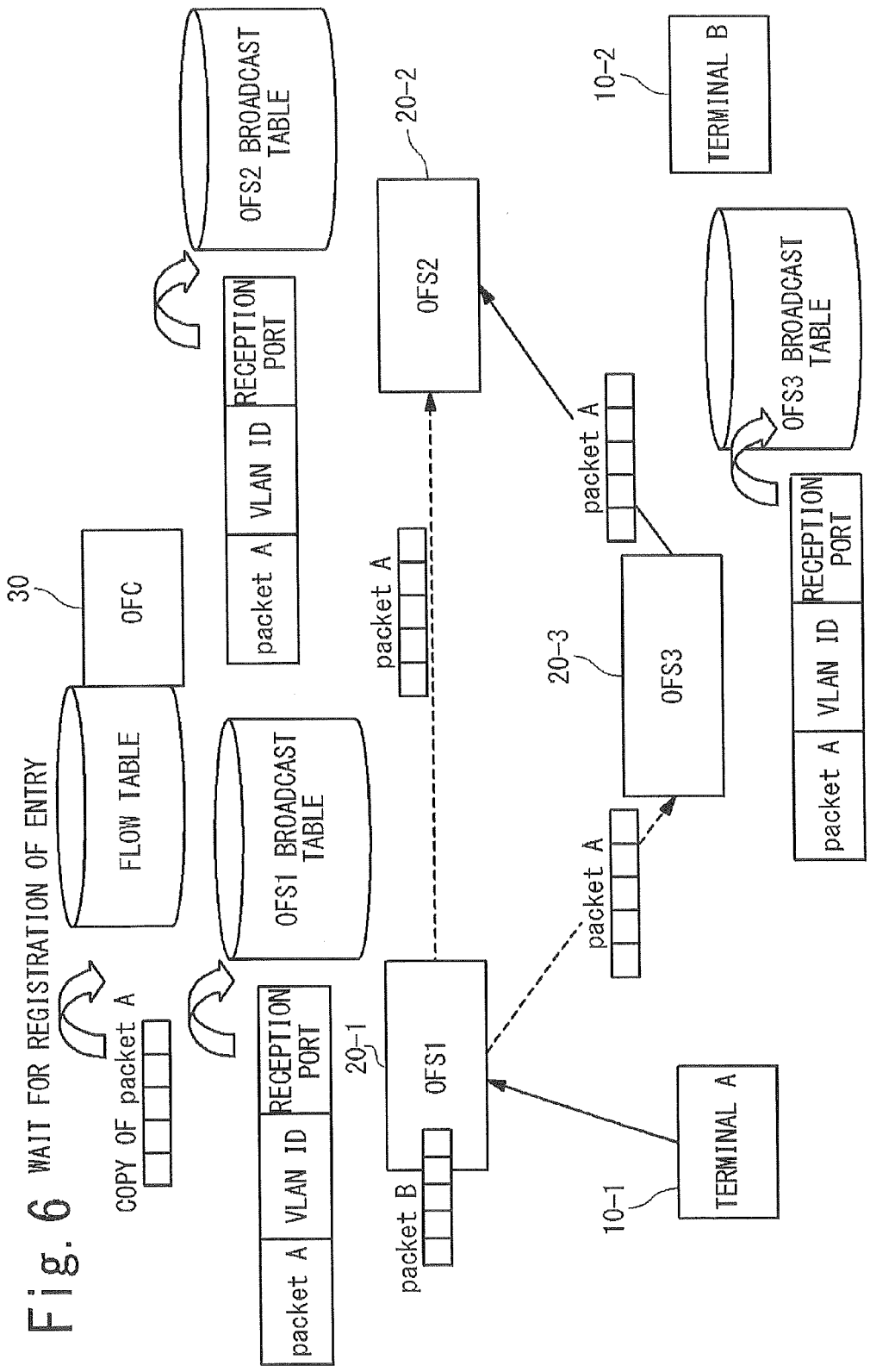
FIG. 6 is a fifth diagram describing the load reducing system according to the present invention.

In FIG. 6, similarly to the above-mentioned switch 20-2 (OFS2), the switch 20-3 (OFS3) broadcasts to all of the ports which have the same virtual LAN identifier (VLAN ID) as the reception port of the first packet (packet A). Here, the switch 20-3 (OFS3) transfers the first packet (packet A) to the switch 20-2 (OFS2). At this time, since the entry is already generated in the broadcast table for the switch 20-2 (OFS2) (refer to FIG. 5) so as to have the virtual LAN identifier (VLAN ID) and the flow data of the first packet (packet A) although the data of reception port is different, the switch 20-2 (OFS2) recognizes that the first packet (packet A) is doubly received (determines that the first packet (packet A) is doubly received), and discards the doubly-received first packet (packet A). Thus, a broadcasted packet is prevented from being looped.

Note that actually, the switch 20-2 (OFS2) and the switch 20-3 (OFS3) may carry out the process similar to that of the switch 20-1 (OFS1). That is, the switch 20-2 (OFS2) and the switch 20-3 (OFS3) may be designed as in the switch 20-1 (OFS1) shown in FIG. 2 so that when receiving the first packet (packet A), the switch 20-1 (OFS1) searches the flow table and transmits the inquiry message (packet in) of the flow entry to the controller 30 (OFC), in order to retrieve the first packet (packet A) in the flow table, if the corresponding flow entry does not exist (in the case of "miss hit").

(Operation of Load Reducing System)

The operation of the load reducing system according to the present invention will be described below with reference to FIG. 7.

(1) Step S101

The switch 20-1 (OFS1) receives a packet.

(2) Step S102

The switch 20-1 (OFS1) checks whether or not the flow entry corresponding to the received packet is already registered in the flow table.

(3) Step S103

If the corresponding flow entry is already registered, the switch 20-1 (OFS1) performs the process of the open flow on the received packet in accordance with the content of the flow entry.

(4) Step S104

If the corresponding flow entry is not still registered, the switch 20-1 (OFS1) checks whether or not the packet of the same flow as the received packet is stacked. That is, the switch 20-1 (OFS1) checks whether or not the packet of the same flow as the received packet is in the waiting state for the entry registration.

(5) Step S105

If the packet of the same flow as the received packet is stacked, the switch 20-1 (OFS1) broadcasts the stacked packet to ports of the same virtual LAN identifier (VLAN ID) as the received packet. Also, the switch 20-1 (OFS1) stacks the newly received packet instead of the already stacked packet.

(6) Step S106

If the packet of the same flow as the received packet is not stacked, the switch 20-1 (OFS1) checks whether or not the received packet is the broadcasted packet. For example, in case where the packet of the flow different from the received packet is stacked, or in case where the packet is not stacked at all, the switch 20-1 (OFS1) checks whether or not the received packet is the broadcasted packet.

(7) Step S107

If the received packet is not the broadcasted packet, the switch 20-1 (OFS1) transfers a copy (mirror packet) of the received packet to the controller 30 as an inquiry message (packet in) of the flow entry. Also, the switch 20-1 (OFS1) stacks the received packet.

(8) Step S108

If the received packet is the broadcasted packet, the switch 20-1 (OFS1) checks whether or not the packet of the same flow as the received packet is already registered in the broadcast table.

(9) Step S109

If the packet of the same flow as the received packet is not registered in the broadcasted packet, the switch 20-1 (OFS1) broadcasts the received packet so that the broadcasted packet is registered in the broadcast table.

(10) Step S110

If the packet of the same flow as the received packet is already registered in the broadcast table, the switch 20-1 (OFS1) checks whether or not the reception port of the packet registered in the broadcast table differs from the reception port of the received packet.

(11) Step S111

The switch 20-1 (OFS1) discards the received packet, if the reception port of the packet registered in the broadcast table differs from the reception port of the received packet.

(12) Step S112

The switch 20-1 (OFS1) broadcasts the received packet, if the reception port of the packet registered in the broadcast table is identical to the reception port of the received packet.

As mentioned above, in the open flow network, when the switch (OFS) continuously receives the packets of the same flow in which their flow entries are not registered in the flow table and further the processing performance of the controller (OFC) is low, this results in the repetition of the transmission of the inquiry message (packet in) of the flow entry to the controller (OFC) from the switch (OFS).

In the present invention, when the switch (OFS) continuously receives the packets of the same flow, the transmission of the inquiry message (packet in) of the flow entry is performed only on the first packet. Thus, the load on the controller (OFC) can be suppressed.

Also, the switch (OFS) broadcasts even the packet whose flow entry is not still registered in the flow table. Thus, it can be transmitted prior to the registration of the flow entry.

Second Exemplary Embodiment

The second exemplary embodiment of the present invention will be described below.

In the first exemplary embodiment of the present invention, when the switch (OFS) transmits the inquiry message (packet in) of the flow entry to the controller (OFC), the switch (OFS) copies the received packet and generates the mirror packet and transmits this mirror packet to the controller (OFC).

In the second exemplary embodiment of the present invention, when the switch (OFS) transmits the inquiry message (packet in) of the flow entry to the controller (OFC), the switch (OFS) is allowed to transfer the received packet itself in its original state to the controller (OFC). At that time, the controller (OFC) carries out a process for transferring (returning) the same packet as the packet used for the transmission of the inquiry message (packet in) of the flow entry, from the switch (OFS). Thus, the similar process is realized.

That is, in this exemplary embodiment, the switch (OFS) transmits not the copy (mirror packet) of the received packet but the received packet itself, as the inquiry message (packet in) of the flow entry.

Third Exemplary Embodiment

The third exemplary embodiment of the present invention will be described below.

In the first exemplary embodiment of the present invention, at the time of the state waiting for the entry registration by the controller (OFC), the switch (OFS) broadcasts the received packet and generates the table for the broadcasted packet (the broadcast table) and registers the received packet in the table, to determine whether or not the same packet has been previously received, and thereby, prevents the broadcasted packet from being looped.

In the third exemplary embodiment of the present invention, the looping of the broadcasted packet can be prevented even at the port at which the open flow function is effective (OpenFlow Enable) by a method of applying a spanning tree protocol (STP) to the broadcasted packet.

That is, in this exemplary embodiment, the broadcasted packet is prevented from being looped without generation for any broadcast table.

<Relation between Exemplary Embodiments>

Note that the above-mentioned exemplary embodiments can be embodied by combining.

<Feature of Present Invention>

In the present invention, the controller is characterized by having a proxy function in which, when it takes a long time to carry out a flow setup, the controller broadcasts the flow received from the switch, and when receiving the packet of the same flow two times or more, the controller discards the flow on and after the second time.

Moreover, the switch is characterized in that, when firstly receiving the flow whose entry is not registered in the flow entry, the switch transmits the flow to the controller, and when receiving the packet of the same flow two times or more, the switch does not transfer the flow on and after the second time to the controller and broadcasts to the same virtual LAN identifier (VLAN ID).

As its result, the present invention is intended to stabilize the system of the open flow network by decreasing the inquiry message (packet in) of the flow entry to the controller and reducing the load of the controller, with regard to the flow whose flow setup has not been completed.

In the present invention, the controller has the proxy function and has the broadcast function in which a source MAC address and a destination MAC address of the flow in which a message to register the flow entry "packet out" is not prepared although the mirror packet of the inquiry message (packet in) of the flow entry is already received are compared with a source MAC address and a destination MAC address of a newly received flow, and the mirror packet of the inquiry message (packet in) of the flow entry can be discarded.

Also, the switch has a function of transferring the packet as the inquiry message (packet in) of the flow entry to the controller, if the corresponding entry is not registered in the flow table. When receiving the packet of the same flow as the inquired packet until the message to register the flow entry "packet out" is received from the controller, after the inquiry message "packet in" of the flow entry is transmitted to the controller, the switch can broadcast to the port of the same VLAN as the reception port for the inquired packet. Also, the switch has a function that, when receiving the broadcasted packet, can store the broadcasted packet in the flow table in a combination of the reception port and the flow.

<Supplemental Note>

A part or entire of the above-mentioned exemplary embodiments can be described as noted in the following supplemental notes. However, actually, the present invention is not limited to the following description examples.

(Supplemental Note 1)

A load reducing system includes:

a switch; and a controller configured to register a flow entry, which defines a rule and an action to uniformly control packets as a flow, in a flow table of the switch, wherein, when receiving a given one of the packets, the switch inquires a flow entry corresponding to the received given packet to the controller, if the flow entry corresponding to the received given packet is not registered in the flow table, and the switch stacks the received given packet, and the switch uses the stacked packet to control a transfer of one of the packets that has a same header data as the stacked packet, until the registration of the flow entry corresponding to the received given packet.

(Supplemental Note 2)

The load reducing system according to supplemental note 1, wherein when receiving a packet until the registration of the flow entry corresponding to the received given packet, the switch checks whether or not the packet having the same header data as the received packet has been stacked, and if the packet having the same header data as the received packet is stacked, the switch broadcasts the stacked packet, and newly stacks the packet.

(Supplemental Note 3)

The load reducing system according to supplemental note 2, wherein if the packet having the same header data as the received packet is not stacked, the switch checks whether or not the received packet is the broadcasted packet, and if the received packet is not the broadcasted packet, the switch inquires the flow entry corresponding to the received packet to the controller and stacks the received packet, and if the received packet is the broadcasted packet, the switch checks whether or not the packet having the same header data as the received packet is already registered in the broadcast table, and if the packet having the same header data as the received packet is not still registered in the broadcast table, the switch registers the received packet in the broadcast table and broadcasts the received packet.

(Supplemental Note 4)

The load reducing system according to supplemental note 3, wherein if the packet having the same header data as the received packet is already registered in the broadcast table, the switch checks whether or not a reception port of the received packet and a reception port of the packet already registered in the broadcast table differ from each other, and if the reception ports differ from each other, the switch discards the received packet, and if the reception ports are identical to each other, the switch broadcasts the received packet.
(Supplemental Note 5)
The load reducing system according to any of supplemental notes 1 to 4, wherein the switch transfers a mirror packet obtained by copying the received packet, to the controller and inquires the flow entry corresponding to the received packet.
(Supplemental Note 6)
The load reducing system according to any of supplemental notes 1 to 4, wherein the switch transfers the received packet itself to the controller and inquires the flow entry corresponding to the received packet and then receives the packet from the controller.
<Remark>
As mentioned above, the exemplary embodiments of the present invention have been described in detail. However, actually, the present invention is not limited to the above-mentioned exemplary embodiments. A modification in the range without departing from the scope of the present invention is included in the present invention.

Note that this application claims a priority based on Japanese Patent Application No. JP 2011-220784, and the disclosure thereof is incorporated herein by reference.

The invention claimed is:

1. A load reducing system comprising:
a switch configured to carry out processing of a received packet based on a flow entry defining a rule and an action to uniformly control packets as a flow; and
a controller configured to set the flow entry to said switch, wherein when receiving a given packet, said switch carries out an inquiry of a flow entry corresponding to the received given packet to said controller, if the flow entry corresponding to the received given packet is not set, stacks the received given packet, and controls a transfer of one of the packets which has a same header data as the stacked packet by using the stacked packet until the flow entry corresponding to the received packet is set.

2. The load reducing system according to claim 1, wherein when receiving a packet until the flow entry is set, said switch checks whether or not a packet which has the same header data as the received packet is stacked, and when the packet which has the same header data as the received packet is stacked, said switch broadcasts the stacked packet, and newly stacks the received packet.

3. The load reducing system according to claim 2, wherein when the packet which has the same header data as the received packet has not been stacked, said switch checks whether or not the received packet is a broadcasted packet, and if the received packet is not the broadcasted packet, said switch carries out an inquiry of the flow entry corresponding to the received packet to said controller, and stacks the received packet, and if the received packet is the broadcasted packet, said switch checks whether or not the packet which has the same header data as the received packet has been set as a broadcast object packet, and if the packet which has the same header data as the received packet has not been set as the broadcast object packet, said switch sets the received packet as the broadcast object packet, and broadcasts the received packet.

4. The load reducing system according to claim 3, wherein if the packet which has the same header data as the received packet has been set as the broadcast object packet, said switch checks whether or not a reception port of the received packet and a reception port which has been set for the broadcast object packet are different from each other, and when the reception ports are different from each other, said switch discards the received packet, and when the reception ports are identical to each other, said switch broadcasts the received packet.

5. A switch comprising:
means for receiving registration of a flow entry that defines a rule and an action to uniformly control packets as a flow from a controller;
means for, when receiving a packet, carrying out an inquiry of the flow entry corresponding to the received packet to said controller if the flow entry corresponding to the received packet has not been set;
means for stacking the received packet; and
means for controlling a transfer of the packet which has the same header data as the stacked packet by using the stacked packet until the registration of the flow entry corresponding to the received packet.

6. The switch according to claim 5, further comprising:
means for, when receiving a packet until the registration of the flow entry, checking whether or not the packet which has the same header data as the received packet is already stacked;
means for broadcasting the stacked packet, when the packet which has the same header data as the received packet is stacked; and
means for newly stacking the packet.

7. The switch according to claim 6, further comprising:
means for checking whether or not the received packet is a broadcasted packet, when the packet which has the same header data as the received packet is still not stacked;
means for carrying out inquiry of the flow entry corresponding to the received packet to said controller and stacking the reception packet, if the received packet is not the broadcasted packet;
means for checking whether or not the packet which has the same header data as the received packet has been registered as the broadcast object packet if the received packet is the broadcasted packet;
means for registering the received packet as the broadcast object packet if the packet which has the same header data as the received packet has not set as the broadcast object packet; and
means for broadcasting the received packet.

8. The switch according to claim 7, further comprising:
means for checking whether a reception port of the received packet and a reception port which has been registered for the broadcast object packet are different from each other if the packet which has the same header data as the received packet has been registered as the broadcast object packet;
means for discarding the received packet when the reception port is different from each other; and
means for broadcasting the received packet when the reception ports are identical to each other.

9. A load reducing method comprising:
receiving registration, by a controller, of a flow entry that defines a rule and an action to uniformly control packets as a flow;
carrying out, when receiving a packet, an inquiry of the flow entry corresponding to the received packet to said controller if the flow entry corresponding to the received packet has not been registered;
stacking the received packet; and
controlling a transfer of a packet which has the same header data as the stacked packet by using the stacked packet, until the flow entry corresponding to the received packet is registered.

10. A non-transitory recording medium which stores a program for making a switch execute:
- receiving registration by a controller, of a flow entry that defines a rule and an action to uniformly control packets as a flow;
- carrying out, when receiving a packet, an inquiry of the flow entry corresponding to the received packet to said controller if the flow entry corresponding to the received packet has not been registered;
- stacking the received packet; and
- controlling a transfer of a packet which has the same header data as the stacked packet by using the stacked packet, until the flow entry corresponding to the received packet is registered.

* * * * *